United States Patent [19]

Han

[11] Patent Number: 5,171,478
[45] Date of Patent: Dec. 15, 1992

[54] THERMALLY INDUCED CHAIN COUPLING IN SOLID STATE POLYANILINE

[75] Inventor: Chien-Chung Han, Madison, N.J.

[73] Assignee: Allied-Signal Inc., Morristown, N.J.

[21] Appl. No.: 664,703

[22] Filed: Mar. 5, 1991

[51] Int. Cl.⁵ .............................................. H01B 1/06
[52] U.S. Cl. .................... 252/500; 252/518; 528/422; 528/480; 528/481; 528/502; 528/503
[58] Field of Search ................ 252/500, 518; 528/422, 528/480, 481, 502, 503

[56] References Cited

U.S. PATENT DOCUMENTS

| | | | |
|---|---|---|---|
| 3,963,498 | 6/1976 | Trevoy | 252/500 |
| 4,025,463 | 5/1977 | Trevoy | 252/500 |
| 4,615,829 | 10/1986 | Tamura et al. | 252/500 |
| 4,798,685 | 1/1989 | Yaniger | 252/500 |
| 4,806,271 | 2/1989 | Yaniger et al. | 252/500 |
| 4,822,638 | 4/1989 | Yaniger | 252/500 |
| 4,851,487 | 7/1989 | Yaniger et al. | 252/500 |
| 4,855,361 | 8/1989 | Yaniger et al. | 252/500 |

FOREIGN PATENT DOCUMENTS

| | | |
|---|---|---|
| 035713 | 2/1981 | European Pat. Off. . |
| 152632 | 12/1984 | European Pat. Off. . |
| 259813 | 9/1987 | European Pat. Off. . |
| 62-12073 | 1/1987 | Japan . |
| 62-47109 | 2/1987 | Japan . |
| PCT/US88/-02319 | 7/1988 | PCT Int'l Appl. . |

OTHER PUBLICATIONS

Chan et al., Thermal Analysis of Conducting Polymers Part I, Journal of Thermal Analysis, 35, 765-774 (1989).
T. Masatake et al; Secondary batteries with polyaniline cathodes Aug. 8, 1988; Chemical Abstracts, vol. 109, No. 6, & Jpn. Kokai Tokyo Koho JP 63; 55,861 (88 55,861) Mar. 10, 1988.
S. Li et al. "Soluble Polyaniline" Synthetic Metals, 20 (1987) 141-149.
K. Hyodo et al. "Short Communication . . . High Ion Selective Electro chemical . . . " Electro Acia vol. 33, No. 1, pp. 165-166, 1983.
L. T. Yu et al. "Conductivite et Constitution Chimique pe Semi Conducteurs Macromoleculaires" Revue Generale de l'Elec . . . vol. 75, No. 9/pp. 1014-1019.
M. Jozefowicz et al. "Relations entre Proprietes Chimiques et . . . " Revue Generale de l'Electricite vol. 75, No. 9, pp. 1008-1013.
D. Muller et al. "Preparation, Proprietes Chimiques et Conduct . . . " pp. 4087-4091.
L. T. Yu et al. "Etude experimentale de la Conductivite en Couran Continu des Composes Macromoleculaires" Jrnl. Polymer Sc. Pt C No. 16/p. 29312942.
M. Jozefowicz et al. "Proprietes Nouvelles des Polymeres Semi . . . " J. Poly. Sci. Part C/No. 22, pp. 1187-1195 (1969).
T. Kobayashi et al. "Electrochemical Reactions Concerned with Electrochromism . . . " J. Electroanal Chem. 177/(1984) pp. 281-291.
T. Kobayashi et al. "Oxidative Degradation Pathway of Polyvanilir Film Electrodes" J. Electroanal Chem. 177 (1984) pp. 293-297.
F. Cristofini et al. "Proprietes Electrochimiques des Sulfates de Polyaniline" C.R. Acad. Sc. Paris, t. 268 (Apr. 14, 1969) pp. 1346-1349.
D. Labarre et al. "Polymeres Conducteurs Organiques Filmogenes a base de Polyaniline" C.R. Acad. Sc. Paris, t. 269 (Oct. 29, 1969) pp. 964-969 Series C.
M. Doriomedoff et al. "Conductivite en Courant Continu des Sulfates de Polyanilines" (#142) pp. 1055-1069.
L-T Yu et al. "Conductivite en Courant Continu des Materiaux Macromoleculaires" pp. 470-532 (Chapter 11).
R. de Surville et al. "Produits Oligomeres et Polymeres d'Oxydation des Amines Aromatiques" Ann. Chim. t2, 1967, pp. 5-13.
R. de Surville, "Electrochemical Chains Using Protolytic Organic Semiconductors" Elec. Acta 1958 vol. 13, pp. 1451-1458.
R. de Surville, "Produits Oxidation Pousée des Amines Aromatiques" Ann. Chim. t2, 1967, pp. 149-157.

Primary Examiner—Karl Group
Assistant Examiner—Anthony J. Green
Attorney, Agent, or Firm—R. C. Stewart, II; G. H. Fuchs; D. L. Webster

[57] ABSTRACT

A process for increasing the intrinsic viscosity of polyaniline by heating the polyaniline in the solid state.

34 Claims, No Drawings

THERMALLY INDUCED CHAIN COUPLING IN SOLID STATE POLYANILINE

BACKGROUND OF THE INVENTION

1. Field of the Invention

This invention relates to thermally induced chain coupling and/or crosslinking of one or more substituted or unsubstituted polyanilines to form homopolymers or block copolymers having a molecular weight which is higher than that of original polyanilines and having securing blocks derived from the original polyanilines. Another aspect of this invention relates to compositions comprising such homopolymers and/or copolymers and other polymers. Yet another aspect of this invention relates to a method of using such polyanilines alone or in combination with compositions to give conducting or non-conductive polymer articles, including films, printings, fibers and coatings, and to methods of fabricating such articles.

2. Description of the Prior Art

There has recently been an increased interest in the electrochemistry and electrical phenomena of polymeric systems. Recently, work has intensified with backbone polymers having extended conjugation in at least one backbone chain.

One conjugated polymer system currently under study is polyaniline. Kobayashi, et al., *J. Electroanal. Chem.*, "Electrochemical Reactions Concerned with Electrochromism of Polyaniline Film-Coated Electrodes", 177 281-291 (1984), describes various experiments in which spectro electro-chemical measurement of a polyaniline film coated electrode were made. French Patent No. 1,519,729; French Patent of Addition 94,536; U.K. Patent 1,216,549; "Direct Current Conductivity of Polyaniline Sulfate", M. Doriomedoff, F. Kautiere — Cristofini, R. De Surville, M. Jozefowicz, L-T. Yu, and R. Buvet, *J. Chim. Phys. Physicochim. Biol*, 68, 1055 (1971); "Continuous Current Conductivity of Macromolecular Materials", L-T. Yu, M. Jozefowicz, and R. Buvet, *Chim. Macromol.* 1, 469 (1970); "Polyaniline Based Filmogenic Organic-Conductor Polymers", D. LaBarre and M. Jozefowicz, *C.R. Acad. Sci., Ser. C*, 269, 964 (1969); "Recently discovered Properties of Semiconducting Polymers", M. Jozefowicz, L-T. Yu, J. Perichon, and R. Buvet, *J. Polym. Sci.*, Part C, 22, 1187 (1969); "Electrochemical Properties of Polyaniline Sulfates", F. Cristofini, R. De Surville, and M. Jozefowicz, *C.R. Acad. Sci., Ser. C*, 268, 1346 (1979); "Electrochemical Cells Using Protolytic Organic Semiconductors", R. De Surville, M. Jozefowicz, L-T. Yu, J. Perichon, R. Buvet, *Electrochem. Acta.*, 13, 1451 (1968); "Oligomers and Polymers Produced by Oxidation of Aromatic Amines", R. De Surville, M. Jozefowicz, and R. Buvet, *Ann. Chem.* (Paris) 2 5 (1967); "Experimental Study of the Direct Current Conductivity of Macromolecular Compounds", L-T. Yu, M. Borredon, M. Jozefowicz, G. Belorgey, and R. Buvet, *J. Polym. Sci. Polym. Symp.*, 16, 2931 (1967); "Conductivity and Chemical Properties of Oligomeric Polyaniline", M. Jozefowicz, L-T. Yu, G. Belorgey, and R. Buvet, *J. Polym. Sci. Polym. Symp.*, 16, 2943 (1967); "Products of the Catalytic Oxidation of Aromatic Amines", R. De Surville, M. Jozefowicz, and R. Buvet, *Ann. Chim.* (Paris), 2, 149 (1967); "Conductivity and Chemical Composition of Macromolecular Semiconductors", *Rev. Gen. Electr.*, 75 1014 (1966); "Relation Between the Chemical and Electrochemical Properties of Macromolecular Semiconductors", M. Jozefowicz and L-T. Yu, *Rev. Gen. Electr.*, 75 1008 (1966); "Preparation, Chemical Properties, and Electrical Conductivity of Poly-N-Alkyl Anilines in the Solid State", D. Muller and M. Jozefowicz, *Bull. Soc. Chem., Fr.* 4087 (1972).

U.S. Pat. Nos. 3,963,498 and 4,025,463 describe oligomeric polyanilines and substituted polyanilines having not more than 8 aniline repeat units which are described as being soluble in certain organic solvents and which are described as being useful in the formation of semiconductors compositions having bulk electrical conductivities up to about $7 \times 10^{-3}$ S/cm and, surface resistivities of $4 \times 10^7$ ohm/square. European Patent No. 0017717 is an apparent improvement in the compositions of U.S. Pat. Nos. 3,963,498 and 4,025,463 and states that the polyaniline can be formed into a latex composite through use of acetone solutions of the oligomers of polyaniline and a suitable binder polymer.

U.S. Pat. No. 4,855,361 describes a conductive polymer blend which comprises mixing a polyimide with a base-type polymer containing carbon nitrogen linkages, such as polyaniline, having a polyimide-like group covalently linked to the nitrogen atoms of the base-type polymer. The conductive polymer blend is formed by first reacting a base-type non-conductive polymer containing carbon-nitrogen linkages, such as polyaniline, with a carbonyl anhydride, such as 3,3',4,4'-benzophenone tetracarboxylic dianhydride to form a conductive polymer containing polyimide-like groups conveniently linked to the nitrogen atoms of the base-type polymer mixing such conductive polymer with non-conductive polyamide in a suitable solvent, removing the solvent, and forming a conductive continuous phase blend of the polyimide and the conductive polymer.

U.S. Pat. No. 4,798,685 describes the production of base-type conductive polymers, particularly from the family of conductive polyaniline, by reacting a base-group non-conductive polymer containing carbon-nitrogen linkages, e.g. polyaniline, with an R+ donor compound, where R is an organic group, e.g. methyl iodide, and forming an electrically conductive polymer iodide, and forming an electrically conductive polymer in which the R groups are covalently linked to the nitrogen atoms of the polymer.

U.S. Pat. No. 4,806,271 describes the production of base-type conductive polymers, particularly from the family of conductive polyaniline, by reacting a base-type non-conductive polymer containing carbon-nitrogen linkages e.g., polyaniline, with a cation donor compound, such as $R_2SO_4R$, $R'SO_2Cl$ or $R''_3SiCl$, where R, R' and R" are alkyl or aryl, such as dimethyl sulfate or tosyl chloride, and forming an electrically conductive polymer in which the R groups of $R_2SO_4$ and $R'SO_2$ groups of $R'SO_2Cl$, or the $R''_3Si$ groups of $R''_3SiCl$ are covalently linked to the nitrogen atoms of the polymer.

U.S. Pat. No. 4,822,638 describes a process for fabricating an electronic device on a non-conductive polymer substrate, particularly from the family of polyaniline, which comprises applying a covalent doping agent, such as an R+ donor compound, where R is an organic group, e.g., methyl iodide, to a preselected portion of a base-type non-conductive polymer substrate containing carbon-nitrogen linkages, and converting such preselected portion of the polymer substrate to an electrically conductive polymer portion, by covalent linkage of the R groups of such donor compound, to the nitrogen atoms of the non-conductive polymer substrate. Electronic devices, such as resistors, capacitors, inductors, printed circuits and the like, can be provided by the invention process, in the form of light-weight polymers containing no metal, and which are stable and wherein the conductive portions are non-diffusing.

U.S. Pat. No. 4,851,487 describes the production of base-type conductive polymers, particularly from the family of conductive polyaniline, by reacting a base-type non-conductive polymer containing carbon-nitrogen linkages, e.g., polyaniline, with an anhydride such as R—$SO_2$—O—$SO_2$—R', R—CO—O—CO—R', R—CO—O—$SO_2$R' or mixtures thereof, where R and R' are alkyl or aryl, e.g., tosylic anhydride of benzophenone tetracarboxylic dianhydride, and forming an electrically conductive polymer in which the $SO_2$R and COR groups are covalently linked to the nitrogen atoms of the conductive polymer and the anion of the conductive polymers is the $SO_3$R' or $O_2$CR' group.

U.S. Pat. No. 4,798,685 describes the production of base-type conductive polymers, particularly from the family of conductive polyaniline, by reacting a base-type non-conductive polymer containing carbon-nitrogen linkages, e.g., polyaniline, with an R+donor compound, where R is an organic group, e.g., methyl iodide, and forming an electrically conductive polymer in which the R groups are covalently linked to the nitrogen atoms of the polymer.

PCT WO89/01694 describes various of electrically conductive polyaniline doped with certain sulfonated dopants materials such as para-toluene-sulfonic acid. It is disclosed that these materials are thermally stable and can be melt blended with other polymers to form blends.

SUMMARY OF THE INVENTION

This invention is directed to thermally induced chain coupling and/or crosslinking of polyanilines or a combination thereof. More particularly, this invention relates to a process for coupling and/or crosslinking neutral or electrically conductive polyaniline to form a polyaniline of higher molecular weight, said process comprises the step of heating said polyaniline or a composition comprising said polyaniline for a time and at a temperature sufficient to increase the molecular weight of the polyaniline to any extent.

Another method of this invention is directed to a process of fabricating an article formed totally or in part from polyaniline which comprises the steps of:

(a) fabricating polyaniline or a composition thereof into an article having a predetermined configuration;

(b) heating said article for a time and at a temperature sufficient to increase the molecular weight of said polyaniline in said article to any extent; and (c) cooling said heated article.

Yet another aspect of this invention relates to a process of fabricating an article formed totally or in part from polyaniline which comprises the steps of (a) forming a melt of a polymer composition comprising melt forming polyaniline or a solution of said composition in a liquid, said solution having a temperature greater than about 30° C., preferably greater than about 50° C., more preferably greater than about 80° C. and most preferably greater than about 100° C.;

(b) fabricating said melt or said solution into an article having a predetermined shape; and (c) cooling said article.

In this embodiment of the invention an optional step includes heating said article to further increase the molecular weight prior to cooling.

The increase in molecular weight can be determined by conventional means such as formation of insoluble fractions and/or increases in intrinsic viscosity. When the process results in the formation of fractions which are insoluble in sulfuric acid (96 to 98 wt %) at 25° C., the molecular weight has increased. Also, when the process has resulted in the formation of material which soluble in sulfonic acid (96 to 98 wt %) at 25° C., the increase in molecular weight, if any, can be determined by increase in the intrinsic viscosity.

As used herein, the "intrinsic viscosity" is the limiting viscosity number of said polyaniline, and is defined as the following:

$$[\eta] = \lim_{c \to o} \frac{\eta - \eta_o}{\eta_o c}$$

where c is the concentration of said polyaniline in a solution of a solvent; $\eta$ is the viscosity of said polyaniline solution having a concentration equal to "C"; and $\eta_o$ is the viscosity of the solvent used to dissolve the polyaniline for viscosity measurement. The intrinsic viscosity is measured by a Cannon – Ubbelohde viscometer using concentrate sulfuric acid (96–98wt %) as the solvent in a 25° C. thermostat water bath.

The process of this invention provides several advantages over conventional methods for processing polyanilines. For example, the process of this invention provides a process for preparing relatively higher molecular weight and relatively higher strength polyaniline articles such as films, fibers and coatings from more easily processed polyanilines having relatively lower molecular weights and relatively lower intrinsic viscosities. Moreover, multi-block polyaniline copolymers having two or more types of polyaniline blocks can be prepared by the process of this invention when more than one type of polyaniline is used in the process.

DESCRIPTION OF THE PREFERRED EMBODIMENTS

The process of this invention comprises the step of heating neutral or electrically conductive polyaniline or a composition comprising said polyaniline for a time and at a temperature sufficient to increase the molecular weight of said polyaniline to the desired extent. The state of the polyaniline during the heating step is not critical. For example, the polyaniline may be neat and in the molten or solid state (below the melting point), or may be in a blend comprising of the polyaniline and one or more other electrically conductive or neutral thermoplastic or thermosetting polymers such as polyester, nylons, phenolics, epoxies, polyolefins, alkyds, allylics and the like, which blends also may be in the molten state, in the solid state. The polyaniline or composition may be these various forms before it is fabricated in a form for heating or after such fabrication. The polyaniline may also be in solution as for example in the solutions of U.S. Pat. No. 4,983,322, of U.S. patent application Ser. No. 630,923 filed Dec. 20, 1990 or U.S. patent application Ser. No. 630,905 filed Dec. 20, 1990, either before the solution is configured in a form for heating or after such configuration.

The shape or configuration of the polyaniline is not critical and may vary widely. For example, the polyaniline may be in the shape of a coating, a fiber, a powder, a film, or a laminate or composite of two or more films. Such coatings, powders, fibers, films, laminates or composites can be formed by conventional coating, powder, film, fiber, laminate or composite forming techniques, as for example those described in "Modern Plastics Encyclopedia", (McGraw Hill. 1991 edition). Such useful techniques include extrusion compounding, extrusion coating, extrusion laminating, solution spinning, wet spinning, gel spinning, dry spinning and the like. The polyaniline can also be in the form of a molded article formed by conventional molding techniques as for example compression molding, rotional molding, steam-chest molding, transfer molding, compression and transfer molding, structural foam molding, multi-layer-blow molding, coinjection molding, blow molding, resin transfer molding, extrusion molding and injection molding, reaction injection molding and the like. These molding procedures are well known in the art (See for example "Modern Plastics Encyclopedia" (McGraw Hill, 1991 edition)).

The polyaniline may be heated using any conventional heating means. Illustrative of such heating means are thermal ovens, infrared ovens, ultraviolet ovens, oil baths, solvent baths, oil, water, inorganic and organic liquids or melts or solutions or vapor, steam, heat-guns, hot-plates, heating rollers, cylindrical band heater, flat strip heater, cartridge heater, tubular heates, fluid bed dryer, and the like.

The polyaniline or composition of polyaniline is heated for a time and at a temperature sufficient to increase the molecular weight to the desired extent. In general, the longer the heating time and the higher the heating temperature the greater the increase in the molecular. Conversely, the shorter the heating times and the lower the heating temperatures, the smaller the increase in the molecular weight. In general, the effective heating times will vary widely depending on the amount of polyaniline, the desired increase in molecular weight, heating temperature, the form of polyaniline and the like, and can range from a fraction of a minute to days or more. Similarly, heating temperatures will also vary widely depending on the amount of the polyaniline, the desired increase in molecular weight, heating times, the form of the Polyaniline and the like and is usually equal to or greater than about 30° C. and is preferably less than the degradation temperatures of the neutral polyaniline, doped electrically conductive polyaniline and/or other components of a polyaniline compositions. For example, where the polyaniline is in the form of a relatively thin article such as a film, printing, coating or like relatively thin article, relatively shorter heating times are required, preferably ranging from a fraction of a minute to several minutes or more; however, where the polyaniline is in the form of a relatively thick or bulky article, relatively longer heating times are required, preferably ranging from a fraction of hour to several hours. Thus, in general the smaller the amount of said polyaniline in the article and the thinner the polyaniline containing portion of the article, the shorter the heating time required. Conversely, the larger the amount polyaniline in the article and the thicker the polyaniline containing portion of the article, the longer the heating time required. Preferably, heating times are at least about a fraction of a minute and heating temperatures are at least about 30° C. and are selected such that the incremental change in intrinsic viscosity is at least about 0.05 dL/g. The upper limit to heating temperatures and times are usually not critical provided that thermally induced polymer degradation does not significantly impair the desired properties of the articles and the upper level in intrinsic viscosity is not critical provided that the final viscosity is not so high as to impair the desired properties. Preferred heating temperatures are at least about 40° C., and heating temperatures and heating times are selected such that the incremental change in the intrinsic viscosity is equal to or greater than about 0.1 dL/g; more preferred heating temperatures are at least about 80° C. and heating times and heating temperatures are selected such that the incremental change in the intrinsic viscosity is equal to or greater than about 0.15 dL/g; and most preferred heating temperatures are at least about 100° C. and heating temperatures and heating times are selected such that the incremental change in intrinsic viscosity is equal to or greater than about 0.20 dl/g.

It has been discovered that shorter heating times can be employed if the polyaniline includes a "plasticizing agent" or if the heating step is carried out in the presence of such a "plasticizing agent". This effect is most notable when the polyaniline or compositions is in the solid state and is heated at a temperature below its melting point. As used herein a "plasticizing agent" is an agent which will soften and increase the flexibility of all or part of the polyaniline, enhancing the degree of motion freedom of the polyaniline chains. This is believed to allow the polyaniline segments or end groups to approach each other more easily at the right angles and distances for effective chain coupling reactions to occur. The extent to which the flexibility and softness of the polyaniline is enhanced can be conveniently measured by the change in glass transition temperature ($T_g$) as measured by differential scanning calorimetry (DSC) analysis of the $T_g$ of the initial polyaniline and the $T_g$ of the polyaniline containing plasticizer at same heating rate. In general, in these preferred embodiments sufficient plasticizer(s) is added such that the $T_g$ of the polyaniline is reduced by at least about 0.01° C. Preferred reductions in $T_g$ is at least about 0.1° C., more preferred reductions in $T_g$ is at least about 0.5° C. and most preferred reductions in $T_g$ is at least about 1° C.

Illustrative of useful plasticizing agents are water; alcohols, such as methanol, ethanol, propanol i-propanol, butanol, t-butanol, octanol, benzyl alcohol, and the like; ethers, such as diethyl ether, dibutyl ether, diphenyl ether, dibenzyl ether, and the like; ketones, such as acetone, methyl ethyl ketone, methyl t-butyl ketone, camphor, acetophenone, benzophenone, and the like; ureas such as diethylurea, diphenylurea, tetramethylurea, dibutylurea, and the like; phenols such as t-butyl phenol, m-cresol and the like; aromatics as for example diphenyls, phenyl compounds and other substituted or unsubstituted aromatic hydrocarbons such as halogenated diphenyls, benzene, anthracene, p-nitrobenzene, naphthalene and the like; amides and phosphoramides such as N,N-dimethyl formamide, N,N-dimethyl acetamide, N-methyl pyrrolidinone, pyrrolidinone, hexamethyl phosphoramide, and the like; sulfur containing compounds such as dimethyl sulfoxide, and the like; amines such as triethylamine, tripropylamine, tributylamine, diethylamine, dibutylamine, dipropylamine, ethylamine, propylamine, butylamine, piperidine, morpholine, pyrrolidine, pyridine, quinoline, aniline, and the like; esters such as ethyl acetate, methyl acetate, phenyl acetate, benzyl acetate, amyl benzoate, benzyl benzoate, dibutyl oxalate, cyclohexanol oxalate, and the like; aromatic acids, and esters thereof such as phthalic acid, terephthalic acid, salicyclic acid, dimethyl phthalate, diethyl phthalate, dibutyl phthalate, dilauryl phthalate, diphenyl phthalate, dibenzyl phthalate, benzyl butyl phthalate, dibutyl terephthalate, diethyl isophthalate, dimethoxyethyl phthalate, and the like; aliphatic acids and esters of aliphatic acids such as esters of adipic acid and sebacic acid, as for example dibutyl adipate, dibutoxyethyl adipate, dimethyl cyclohexanol adipate, dibutyl sebacate, dioctyl sebacate, dibenzyl sebacate, and the like, esters of lauric acid, oleic acid, and stearic acid, as for example, butyl laurate, diethylene glycol-monolaurate, ethyl oleate, amyl oleate, butoxyethyl oleate, butyl stearate, methyl cellosolve stearate and cyclohexanolstearate, esters of abietic acid and ricinoleic acid, as for example methyl abietate, methyl dihydroxy abietate, ethylene glycol diabietate, butyl acetyl ricinoleate, glyceryl-mono-ricinoleate, and esters of citric acid and tartaric acid, as for example, tributyl citrate, triamyl citrate, diethyl tartrate, dibutyl tartrate, and the like; glycol and glycol derivatives, such as glycerol, ethylene glycol, diethylene glycol, triethylene glycol, polyethylene glycol, glycerolmonoacetate, glycerol-diacetate, glyceroltriacetate, glyceroltributyrate glycol diformate, butyl phthalyl butyl glycollate, and the like; phosphates, silicates and borates such as triethyl phosphate, trichloroethyl phosphate, triphenyl phosphate, tributyl glycol phosphate, ethyl silicate, butyl silicate, amyl borate, tributyl borate, and the like; aromatic and aliphatic sulfonic acids and their derivaties such as toluene sulphonamide, N-ethyl toluene sulfonamide, p-toluene sulfonic acid, nonyl sulfonic acid, methyl sulfonic acid, benzene sulfonic acid, naphthalene sulfonic acid, naphthalene 2,5-disulfonic acid, p-dodecyl benzene sulfonic acid, toluene sulphanilide, N-methyl-p-toluene sulphonilide, N-p-toluene sulphonyl ethanolamine, aryl sulphonamide-formaldehyde resins, and the like; fluorinated hydrocarbons, fluorinated carboxylic acid and fluorinated sulfonic acids, such as prefluoro propanoic acid, perfluoro butyric acid, prefluoro octanoic acid, trifluoro acetic acid, trifluoro methane sulfonic acid, pentafluoro ethane sulfonic acid, and the like; and synthetic waxes, thermo plastic resins, and the like;

Preferred plasticizing agents are water, alcohols, ketones, phenols, amines, esters, glycol derivatives, fluorinated carboxylic and sulfonic acids, dimethyl sulfoxide, amides and phosphoramides. More preferred plasticizing agents are water, alcohols, ketones, amines, esters, fluorinated carboxylic and sulfonic acids, dimethyl sulfoxide, amides and phosphoramides. Most preferred plasticing agents are water, alcohols, especially, methanol, ethanol, isopropanol, and n-propanol; ketones, especially acetone, methyl ethyl ketone and methyl t-butyl ketone; amines, especially triethyl amine, tributyl amine, morpholine, piperidine and pyrrolidine; fluorinated carboxylic and sulfonic acids, especially perfluoroaliphatic acids, such as perfluorobutyric acid, perfluorooctanoic acid, trifluoromethane sulfonic acid, and pentafluoro ethane sulfonic acid; dimethyl sulfoxide; amides, especially N,N-dimethyl formamide, N,N-dimethyl acetamide, N-methyl pyrrolidinone and pyrrolidinone, and phosphoroamides especially hexamethyl phosphoramide.

The increased number average molecular weight of the polyaniline can be evaluated by conventional means. For example, the increase in molecular weight can be evaluated qualitatively by determining the extent to which the polyaniline has formed fractions which are insoluble in 96 to 98 wt % sulfuric acid at 25° C. The presence of such fractions usually indicate a relatively high molecular weight or relatively extensive crosslinking. Where the is soluble in sulfuric acid, the increase in number average molecular weight can evaluated by monitoring the increase in intrinsic viscosity.

The number average molecular weight of the polyaniline (as measured by gel permeation chromatography) is believed to be increased by a coupling reaction as for example by linear coupling (i.e. at the ends of the polymer chain) such as head to tail, or head to head, or tail to tail, by branching (i.e. along the polymeric backbone at any site other than the end recurring monomeric units), by cross-linking of two or more polyaniline chains forming a two or three dimension polymeric network or by a combination thereof. In the preferred embodiments of the invention, the increased number average molecular weight results primarily from linear coupling and branching and in the more preferred embodiments the number average molecular weight is increased primarily by linear coupling. It has been discovered that the heating temperature affects the ratio of linear coupling to branching. In general, at higher temperatures i.e. equal to or greater than about 150° C. molecular weight is increased to a greater extent by branching, and such branching increases thereafter with increasing temperature. At lower temperatures i.e. less than about 150° C., molecular weight is increased to a greater extent by linear coupling and such linear coupling increases thereafter with decreasing temperature until the temperature at which no further increases in intrinsic viscosity occur is reached.

The temperature ranges and heating times at which linear coupling predominates and at which branching predominates will vary depending on the particular polyaniline. Such can be readily determined through use of simple heating experiments coupled with NMR analysis with the particular substituted or unsubstituted polyaniline. As representative, example unsubstituted polyaniline when heated at a temperature of up to about 160° C. will increase its molecular weight predominantly by linear coupling. However, at a temperature of greater than about 130° C. the polyaniline will begin to increase its molecular weight also by branching and the degree of branching will increase with increasing temperature. Similarly, other substituted polyanilines can be evaluated to determine the range at which branching or linear coupling occurs. Preferred heating temperatures for linear coupling with unsubstituted polyaniline are from about 30° C. to about 150° C., more preferred heating temperatures for linear coupling are from about 50° C. to about 130° C. and most preferred heating temperatures for linear coupling are from about 80° C. to about 130° C. Preferred heating temperatures for branching with unsubstituted polyanilines are greater than about 100° C., more preferred heating temperatures for branching are greater than about 130° C. and most preferred heating temperatures for branching are greater than about 150° C.

The polyanilines for use in the practice of this invention will usually have an intrinsic viscosity of less than about 1.6 dL/g. This allows for easier processing in conventional processing procedures as for example melt and solution processing to form polyaniline or polyaniline articles for use in the heating step. The intrinsic viscosity of the polyaniline is preferably less than about 1.5 dL/g, more preferably from about 0.05 dL/g to about 1.2 dL/g and most preferably from about 0.05 dL/g to about 0.8 dL/g.

Polyanilines for use in the process of this invention may vary widely. Any form of substituted and unsubstituted polyaniline can be conveniently used in the practice of this invention. Illustrative of useful forms are those described in Green, A. G. and Woodhead, A. E., CXVII — Aniline-black and Allied Compounds, Part II", *J. Chem. Soc.*, 101 pp. 1117 (1912) and Kobayashi, et al., "Electrochemical Reactions . . . of Polyaniline Film-Coated Electrodes", *J. Electroanal. Chem.*, 177, pp. 281-91 (1984) and in Shacklette, L. W., et al. "Structure and Properties of Polyaniline as Modeled by Single-Crystal Oligomers", *J. Chem. Phys.*, 88, pp. 3955 (1988), which are hereby incorporated by reference. Examples of unsubstituted and substituted polyaniline useful in this invention are characterized by different ratios of phenylene amine and quinone imine backbone segments and include leucoemeraldine, protoemeraldine, emeraldine, nigraniline and pernigraniline.

In the preferred embodiments, polyanilines for use in the invention are polyaniline homopolymers and copolymers of the type derived from the polymerization of one or more unsubstituted and substituted anilines of the Formula I:

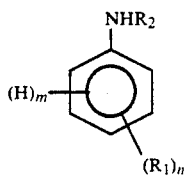

wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units such halo, hydrozen or other leaving group;

$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate salts, arylsulfinyl, alkoxycarbonyl, arylsulfonyl, carboxylic acid, phosphonic acid, halo, hydroxy, cyano, sulfinic acid, carboxylate salts, borate salts, phosphate salts, sulfonate salts, phosphinate salts, phosphonate salts, phosphonic acid, sulfonic acid, nitro, alkylsilane, or any of the foregoing aryl, aliphatic or cycloaliphatic groups substituted with one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or any two $R_1$ groups together or any $R_2$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more phosphonic acid, sulfonic acid, phosphoric acid, boric acid, carboxylate salt, borate salt, sulfonate salt, phosphinate salts, phosphonate salt, phosphate salt, phosphinic acid, carboxylic acid, halo, nitro, amino, alkylamino, dialkylamino, arylamino, diarylamino, alkylarylamino, cyano or epoxy moieties; or $R_1$ is an aliphatic moiety having repeat units of the formula:

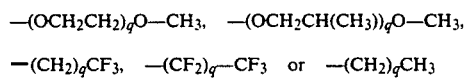

wherein q is a positive whole number; and $R_2$ is selected from the group consisting of permissible $R_1$ substituents hydrogen.

Illustrative of the polyanilines useful in the practice of this invention are those of the Formulas II to V:

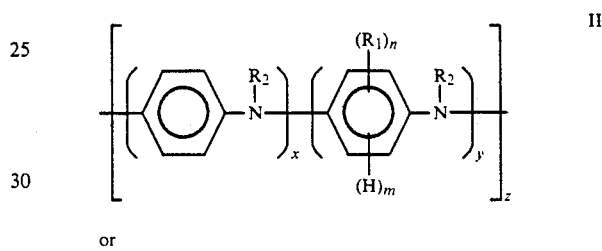

or

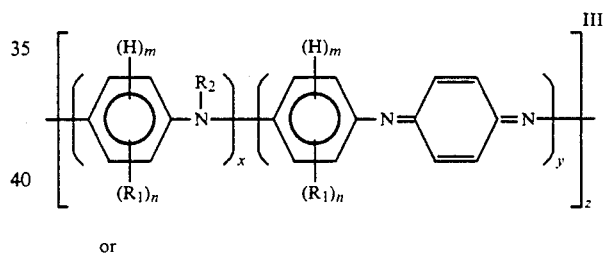

or

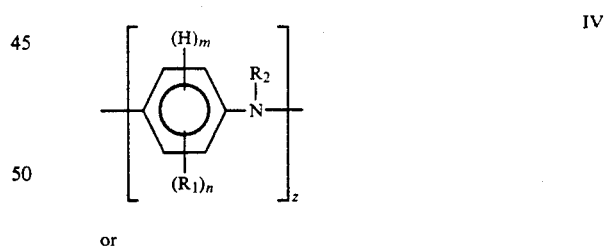

or

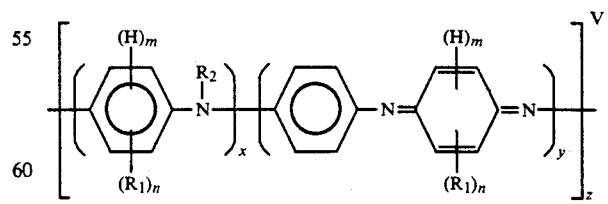

wherein:

n, m, $R_1$ and $R_2$ are as described above;

x and y are the same or different at each occurrence and are integers equal to or greater than 0, with the proviso that the sum of x and y is greater than 0, preferably x is an integer equal to or greater than about 1 and/or the ratio of x to y is greater than or equal to about 0; and z is the same or different and is an integer equal to or greater than 1.

The following listing of substituted and unsubstituted anilines are illustrative of those which can be used to prepare polymers and copolymers useful in the practice of this invention:

| | |
|---|---|
| 2-Cyclohexylaniline | 2-Acetylaniline |
| Aniline | 2,5-Dimethylaniline |
| o-Toluidine | 2,3-Dimethylaniline |
| 4-Propanoylaniline | |
| 2-(Methylamino)aniline | 4-Benzylaniline |
| 2-(Dimethylamino)aniline | 4-Aminoaniline |
| 2-Methyl-4-methoxy carbonylaniline | 2-Methylthiomethylaniline 4-(2,4-Dimethylphenyl) aniline |
| N-Ethylaniline | 2-Ethylthioaniline |
| 4-Carboxyaniline | N-Methyl aniline |
| N-Methyl aniline | |
| 2,4-Dimethylaniline | |
| N-Propyl aniline | N-Propyl-m-toluidine |
| N-Hexyl aniline | N-Methyl-o-cyanoaniline |
| m-Toluidine | 2,5-Dibutylaniline |
| o-Ethylaniline | 2,5-Dimethoxyaniline |
| m-Ethylaniline | Tetrahydronaphthylamine |
| o-Ethoxyaniline | o-Cyanoaniline |
| m-Butylaniline | 2-Methylthioaniline |
| m-Hexylaniline | 2,5-Dichloroaniline |
| m-Octylaniline | 3-(n-Butanesulfonic acid) aniline |
| 4-Bromoaniline | 3-Propoxymethylaniline |
| 2-Bromoaniline | 2,4-Dimethoxyaniline |
| 3-Bromoaniline | 4-Mercaptoaniline |
| 3-Acetamidoaniline | 4-Ethylthioaniline |
| 4-Acetamidoaniline | 3-Phenoxyaniline |
| 5-Chloro-2-methoxy-aniline | 4-Phenoxyaniline |
| 5-Chloro-2-ethoxy-aniline | N-Octyl m-toluidine |
| N-Hexyl-m-Toluidine | 4-Trimethylsilylaniline |
| 4-Phenylthioaniline | 3-Amino carbazole |
| 3-Amino-9-methylcarbazole | N-(p-Amino phenyl) aniline |
| 4-Amino carbazole | |

Illustrative of useful $R_1$ groups are hydrogen, alkyl, such as methyl, ethyl, octyl, nonyl, tert-butyl, neopentyl, isopropyl, sec-butyl, dodecyl and the like; alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitro benzene sulfonic acid, butylsulfonic acid, phenylsulfonic acid, and the like.

Also illustrative of useful $R_1$ groups are divalent moieties derived from any two $R_1$ groups or a $R_1$ group with a $R_2$ group such as moieties having from about 2 to about 7 repeat units of the formula:

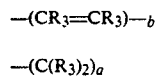

$$-(CR_3 = CR_3)-_b$$

$$-(C(R_3)_2)_a$$

wherein $R_3$ is the same or different at each occurrence and is hydrogen or alkyl, as for example $-(CH_2)_4-$, $-(CH_2)_3-$, $-(CH=CH-CH=CH)-$, $-[CH_2-CH(CH_3)-CH_2]-$ and $-(CH_2)_5-$, and groups comprised of such moieties which include one or more heteroatoms of oxygen, nitrogen, ester, sulfonyl, carbonyl, sulfinyl, and/or sulfur, such as $-CH_2SCH_2-$ $-CH_2NHCH_2-$, $-SCH_2NHCH_2-$, $-O-CH_2-CH_2O-$ $-O-CH_2-S-CH_2-$, $-CH_2S(O_2)CH_2-$, $-CH_2S(O)CH_2-$, $-OC(O)CH_2CH_2-$, $-CH_2C(O)CH_2-$ and $-CH_2-O-CH_2-$ to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine,benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothio-pyran,aminobenzodiazine, benzethiopyrone amine, amino-coumarin, benzthiopheneamine, benzothiodiazoleamine, and the like.

Exemplary of useful $R_2$ groups are hydrogen and the above-referenced representative $R_1$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

Preferred for use in the practice of this invention are polyanilines of the above Formulas II to V in which:

n is an integer from 0 to about 2;

m is an integer from 2 to 4, with the proviso that the sum of n and m is equal to 4;

$R_1$ is aryl, alkyl or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid, sulfinate salt, carboxylate salt, sulfonate salt, amino, alkylamino, dialkylamino, arylamino, hydroxy, diaryiamino, alkylarylamino, or alkyl, aryl or alkoxy substituted with phosphonic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphonate salt, phosphinate salts, carboxylic acid or sulfonic acid substituents;

$R_2$ is the same or different at each occurrence and is a $R_1$ substituent or hydrogen;

x is an integer equal to or greater than 1;

y is equal to or greater than 0, with the proviso that the ratio of x to y is greater than about 0.5; and z is an integer equal to or greater than about 5.

Particularly preferred for use in the practice of this invention are polyanilines of the above Formulas in which:

n is an integer from 0 to 1;

m is an integer from 3 to 4, with the proviso that the sum of n and m is equal to 4;

$R_1$ is aryl, alkyl or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylarylamino, or alkyl or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents;

$R_2$ is the same or different at each occurrence and is a $R_1$ substituent or hydrogen;

x is an integer equal to or greater than 2;

y is equal to or greater than 0, with the proviso that the ratio of x to y is greater than about 1; and z is an integer equal to or greater than about 5.

Amongst the particularly preferred embodiments, most preferred for use in the practice of this invention are polyanilines of the above Formulas III or V in which:

n is an integer from 0 to 1;

m is an integer from 3 to 4, with the proviso that the sum of n and m is equal to 4;

$R_1$ is aryl, alkyl, alkoxy, amino, alkylamino, dialkylamino, arylamino, diarylamino, alkylarylamino, halo, sulfonic acid, sulfonate salt, carboxylic acid or carboxylate salt, or alkyl or aryl substituted with one or more sulfonic acid, carboxylate salt, amino, alkylamino, dialkylamino, arylamino, diarylamino, halo, alkylarylamino, sulfate salt, sulfonate salt, or carboxylic acid substituents, wherein the aromatic moieties include from 6 to about 21 carbon atoms and the aliphatic moieties include from 1 to about 15 carbon atoms;

$R_2$ is hydrogen;

x is an integer equal to or greater than 2;

y is equal to or greater than 1, with the proviso that the ratio of x to y is equal to or greater than about 2; and z is an integer equal to or greater than about 5.

In the most preferred embodiments of this invention, the polyaniline is derived from unsubstituted aniline, alkoxy, alkyl, or sulfonic acid substituted aniline or copolymers thereof.

In general, the number of aniline repeat units is not critical and may vary widely. The greater the number of aniline repeat units the greater the viscosity and molecular weight of the polyaniline. In those applications where a polyaniline of lower molecular weight and viscosity is required, such material may be used, and in those applications where a polyaniline of high molecular weight and viscosity is required, then such material can be used. The number of aniline repeat units is preferably at least about 10. The upper limit can vary widely depending on the desired viscosity and molecular weight. In the more preferred embodiments of the invention, the number of aniline repeat units is at least about 20, and in the particularly preferred embodiments, the number of repeat units is at least about 30. Amongst the particularly preferred embodiments, most Preferred are those embodiments in which the number of repeat units is at least about 40.

Useful polyanilines can be prepared through use of chemical and electrochemical synthetic procedures. For example, one form of polyaniline can be Prepared by treating aniline with ammonium persulfate $(NH_4)_2S_2O_8$ in excess 1 M HCl. This powdered form of polyaniline is blue green in color. After methanol washing and air drying this material exhibits a conductivity of 10 S/cm. This conductive form of polyaniline can be treated with ammonium hydroxide in ethanol to form a non-conductive form of polyaniline which is purple in color and which has a conductivity of less than $10^{-8}$ S/cm. Other chemical procedures for preparation of various chemical forms of polyaniline are described in detail in Green et al. described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The polyaniline may be electrically neutral or electrically conductive polyaniline may be used. Polyaniline is rendered electrically conductive by doping with a dopant solute. In general, such dopant solute is derived from a compound, which upon addition to the polyaniline, ionizes the polymer with co-committent formation of a dopant solute species to form a charge transfer complex with polyaniline, which complex has a conductivity equal to or greater than about $10^{-6} ohm^{-1} Cm^{-1}$ by the four-in-line probe method.

Dopants for use in the practice of this invention can vary widely and can be such materials which are known in the art for use in doping conjugated backbone polymers to form conductive or semi-conductive polymers, as for example, those described in detail in U.S. Pat. Nos. 4,442,187 and 4,321,114 which are hereby incorporated by reference. Illustrative of useful dopant species are oxidizing dopants. Oxidizing dopants are well known in the conductive polymer art, and any of such known oxidizing dopants can be used. Illustrative of useful oxidizing dopants are $AsF_5$, $MoOCl_4$, $MoCl_5$, $PCl_5$, $POCl_3$, $PCl_3$, $AlCl_3$, $NO^+$ and $NO_2^+$ salts (such as $NOBF_4$, $NOPF_6$, $NOSbF_6$, $NOAsF_6$, $NOCH_3CO_2$, $NO_2BF_4$, $NO_2PF_6$, $NO_2AsF_6$, $NO_2SbF_6$, and $NO_2CF_3SO_2$), $HClO_4$, $HNO_3$, $H_2SO_4$, benzoylperoxide, $SO_3$, $Br_2$, $(FSO_3)_2$, $ZnCl_2$, $FSO_3H$, and Fe(III) salts (such as $Fe(BF_4)_3$, $FeBr_3$, $Fe(CH_3SO_3)_3$, $Fe(ClO_4)_3$, $FeCl_3$, $Fe(OTs)_3$, and $Fe(CF_3SO_3)_3$ which give rise to doped polymers containing dopant solutes such as $NO_3^-$, $CH_3SO_3^-$, $AlCl_4^-$, $BF_4^-$, $ZnCl_4^-$, $PCl_4^-$, $PF_6^-$, $AsF_6^-$, $SbF_6^-$, $CF_3SO_3^-$, $ClO_4^-$, $OTs^-$, $SO_3^{-2}$, $C_6H_5CO_2^-$, $CH_3SO_3^-$, $FSO_3^-$, and $FeCl_4^-$. Other useful oxidizing dopants include electrolyte salts such as $LiClO_4$, $LiBF_4$, $LiAsF_6$, $NaPF_6$, $Bu_4NClO_4$, $Bu_4NOTs$, $Bu_4NCF_3SO_3$, $LiCF_3SO_3$, $AgOTs$, and the like. Preferred oxidizing dopants for use in the practice of this invention are oxidizing dopants selected from the group consisting of $MoOCl_4$, $MoCl_5$, $PCl_5$, $POCl_3$, and Fe (III) salts such as $Fe(ClO_4)_3$, $FeCl_3$, $FeBr_3$, and $Fe(CF_3SO_3)_3$, and particularly preferred oxidizing dopants for use in the practice of this invention are dopants selected from the group consisting of $MoOCl_4$, $MoCl_5$, $PCl_5$, $POCl_3$, $FeBr_3$ and $FeCl_3$. Amongst these particularly preferred embodiments, most preferred oxidizing dopants are those embodiments in which the oxidizing dopant is $FeCl_3$.

Illustrative of other dopants are oxidizing protonic acid dopants. Such dopants include inorganic acid, hydrofluoric acid, hydroiodic acid, phosphoric acid, nitric acid, boric acid, sulfuric acid and the like.

Illustrative of still other useful dopants are non-oxidizing protonic acids such as those of containing anionic moieties of the formula:

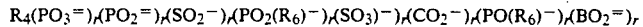

and having one or more cationic moieties selected from the group consisting of:

wherein:

$R_4$ and $R_6$ are the same or different at each occurrence and are organic radical or amino;

M is a species having a positive charge equal to s, provided that at least one of $M^{+s}$ is a proton or a moiety which can be transformed by radiation, heat, chemicals and the like into a proton under use conditions such as $NH_4^+$, $^+N(CH_3)_2H_2$, $^+N(C_2H_5)H_3$ and the like;

s is the same or different at each occurrence and is an integer equal to 1 to 8;

r is the same or different at each occurrence and is 0 or a positive integer equal to or greater than 1, with the proviso that at least one of r is other than 0.

The $R_4$ and $R_6$ group may vary widely and can be a substituted or unsubstituted aliphatic radical such as alkyl, nitroalkyl, haloalkyl and the like, or a substituted or unsubstituted aromatic radical such as phenyl, halophenyl, nitrophenyl, anthracyl, naphthyl, phenanthryl and the like. $R_4$ and $R_6$ groups may also be a polymeric radical such as a polymer having recurring pendant phenyl groups in the polymeric backbone substituted with sulfonic acid and derivatives thereof such as salts, phosphoric acid and derivatives thereof such as salts, phosphonic acid and derivatives thereof such as salts, sulfinic acid and derivatives thereof such as salts, carboxylic acid and derivatives thereof such as salts, boric acid and derivatives thereof such as salts, or phosphonic acid and derivatives thereof such as salts; moieties such as sulfonated or phosphonated polystyrene, poly(2-methylstyrene), poly(4-phenylstyrene), poly(2-vinyl naphthalene), poly(vinyl benzoate), poly(benzyl methacrylate) and the like. In the particularly preferred embodiments of the invention, $R_4$ and $R_6$ are aromatic radical and in the most preferred embodiments $R_4$ and $R_6$ are substituted or unsubstituted phenyl or naphthyl. The nature of the $M^{+n}$ group may vary widely. For example, $M^{+n}$ may be a non-metal cation such as $Bu_4N^+$, $H^+$, $NO^+$, $NO_2^+$, $NH_4^+$, $^+N(CH_3)_2H_2$, $^+N(C_2H_5)H_3$, and the like, or may be a metal cation such as $Na^+$, $Li^+$, $Ag^+$, $Ba^{+2}$, $Co^{+3}$, $Al^{+3}$, $Fe^{+3}$ and the like.

Preferred for use in the practice of this invention are organic acid dopants, more preferably those having anionic moieties of the formulas:

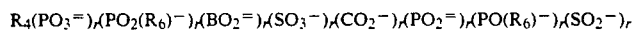

and having a cationic moiety of the Formula:

wherein at least one of the cationic moieties of the formula $M^{+s}$ is a proton or is a moiety which can be transformed into a proton under use conditions;

$M^{+s}$ is a cationic species having or positing charge s;

s is an integer equal to or greater than 1, preferably from 1 to about 8;

$R_4$ and $R_6$ are organic radicals or amino, and r is an integer equal to or greater than 1, preferably from 1 to about 8;

More preferred for use in the practice of this invention as dopants are acids or acid derivatives of the formula:

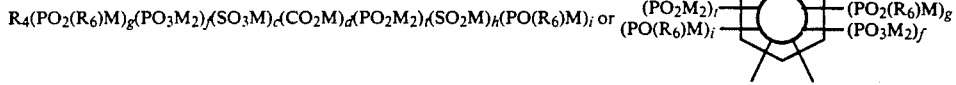

wherein:

M is $H^+$, or other metal or non-metal cation with the proviso that at least one of M is $H^+$ or a moiety which can be thermally or chemically transformed into a proton under use conditions, such as $^+NH_4$, $^+N(CH_3)_2H_2$, $^+N(C_2H_5)H_3$ and the like t is 0, 1, 2, 3 or 4;

h is 1, 1, 2, 3 or 4;

i is 1, 1, 2, 3 or 4;

c is 0, 1, 2, 3 or 4;

d is 0, 1, 2, 3 or 4;

f is 0, 1, 2, 3 or 4;

g is 0, 1, 2, 3 or 4, with the proviso that at least one of c, d, f, g, h, i or t is other than 0;

e is 0, 1 or 2; and $R_4$ and $R_5$ are the same or different at each occurrence and are nitro, cyano, hydroxy, halo, amino, alkylamino, dialkylamino, arylamino, diarylamino, alkylarylamino, alkoxy, or salt substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid phosphate salt, boric acid, sulfinate salt, phosphinate salt, sulfinic acid, borate salt, phosphinic acid, phosphonate salt, phosphonic acid, carboxylic acid, nitro, carboxylate salt and the like, or any two $R_4$ or any two $R_5$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or $R_4$ or $R_5$ is a moiety of the formula:

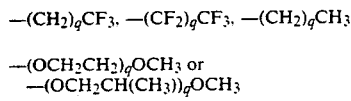

wherein:

q is a positive whole number from 1 to about 10; and $R_6$ is alkyl, aryl, aryloxy or alkoxy.

In the particularly preferred embodiment of this invention, useful dopants are acids and/or acid derivatives of the above formula:

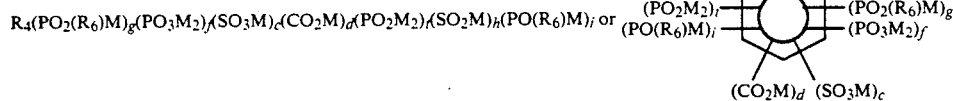

wherein:

c is 0, 1, 2 or 3;

d, t, f, g, h and i are the same or different at each occurrence and are with the proviso that at least one of c, d, t, f or g, i or h is other than 0;

e is 0, 1 or 2;

$R_4$ and $R_5$ are the same or different are hydroxy, amino, alkylamino, dialkylamino, arylamino, diarylamino, alkyl aryl amino, substituted or unsubstituted phenyl or alkyl wherein permissible substituents are selected from the group consisting of alkyl, hydroxy, amino, alkylamino, dialkylamine, arylamine, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphinate salt, sulfonic acid, carboxylic acid, phosphoric acid, sulfinic acid or sulfinate salts or any two $R_6$ substituents together may form an unsubstituted or substituted or alkenylene chain completing a naphthalene, anthracene or phenanthracene fused ring system wherein permissible substituents are as described above or $R_4$ or $R_5$ is a moiety of the formula:

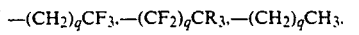

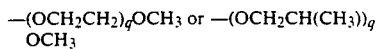

wherein:

q is a positive whole number from 1 to about 10;

$R_6$ is alkyl, alkoxy, aryloxy or aryl; and

M is $H^+$, or other metal or non-metal cation, with the proviso that at least one of M is $H^+$ or a moiety which can be thermally or chemically transformed into a proton under use conditions.

In the most preferred embodiments of this invention, useful dopants are acids and/or acid derivatives of the formula:

or

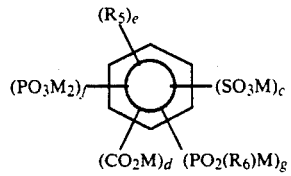

wherein:

c, d, e, f and g are the same or different and are 0, 1 or 2, with the proviso that at least one of c, d, f and g is not 0;

$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphonic acid phosphinate salt, phosphonate salt, amino or carboxylic acid groups, or phenyl substituted with one or more alkyl, alkoxy, fluoroalkyl, sulfonic acid, phosphinic acid, phosphonic acid, phosphinate salt, phosphonate salt, sulfonate salt, carboxylate, hydroxy, nitro, cyano, or carboxylic acid groups or any two $R_4$ or $R_5$ substituents together may form an alkylene or alkenylene chain completing a naphthalene anthracene or phenanthracene fused system which may be substituted with one or more alkyl, alkoxy, fluoro, phosphinic acid, phosphinate salt, phosphonic acid, phosphonate salt, fluoroalkyl, sulfonic acid, sulfonate salt, carboxylic acid, carboxylate salt, hydroxy, nitro, amino or cyano groups;

$R_6$ is aryl, aryloxy, alkyl or alkoxy; and

M is $H^+$ or other metal or non-metal cation, with the proviso that at least one of M is $H^+$ or is a moiety which can be thermally transformed into a Proton under process conditions.

In the especially preferred embodiments of this invention, useful dopants are acids or acid derivatives of the formula:

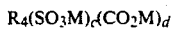

or

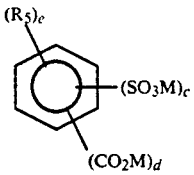

wherein:
c is 1, 2 or 3;
d is 1, 2 or 2 with the proviso that at least one of c, d is not 0
e is 0, 1 or 2;

$R_4$ and $R_5$ are the same or different at each occurrence and are hydroxy, dialkylamino, diarylamino, alkylarylamino, amino, alkylamino, arylamino, alkyl, phenyl, alkyl substituted with one or more fluoro, sulfonic acid, sulfonate salt, alkoxy, dialkylamino, diarylamino, alkylarylamino, carboxylate salt, hydroxy, alkylamino, arylamino, phosphonic acid, nitro, cyano, phosphinic acid, phosphinate salt, phosphonate amino or carboxylic acid groups, or phenyl substituted with one or more alkyl, alkoxy, fluoroalkyl, dialkylamino, diarylamino, alkylarylamino, sulfonic acid, alkylamino, arylamino, sulfonate salt, carboxylate salt, hydroxy, phosphinate acid, phosphinate salt, nitro, cyano, amino or carboxylic groups or any two $R_4$ and $R_5$ substituents together may form an alkylene or alkenylene chain completing a naphthalene, anthracene or phenanthracene fused system which may be substituted with one or more alkyl, alkoxy, fluoro, fluoroalkyl, sulfonic acid, sulfonate salt, carboxylic acid, phosphinic acid, phosphinate salts, carboxylate salt, hydroxy, nitro, amino, alkylamino, dialkylamino, arylamino, diarylamino, alkylarylamino, or cyano groups;

M is $H^+$ or other metal or non-metal cation or a moiety which can be thermally transformed into a proton under process conditions.

In the process of this invention of choice, the dopant is a sulfonic acid or sulfonic acid derivative of the formula:

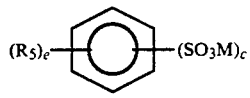

wherein;
c is 1, 2 or 3;
e is 0, 1 or 2;

$R_5$ is alkyl or alkyl substituted with one or more fluoro groups, or any two $R_2$ groups together may form an alkenylene chain completing a naphthalene fused ring system which may be substituted with one or more sulfonic acid, sulfonic salt group or a combination thereof; and M is a proton, or other metal or non-metal cation, with the proviso that at least one of M is proton.

The following is a listing of dopants which are useful in the practice of the most preferred embodiments of this invention for formation of the dopant solute.

1-anthracene sulfonic acid,
9-anthracene sulfonic acid,
2-phenanthracene sulfonic acid,
3-phenanthracene sulfonic acid,
9-phenanthracene sulfonic acid,
$NO_2CF_3SO_3$,
$CF_3SO_3H$,
perflouro octyl sulfonic acid
perfluoro octyl carboxylic acid
octylsulfonic acid,
dodecylsulfonic acid,
cetylsulfonic acid,
toluenesulfonic acid (TsOH),
$Fe(OTs)_3$,
$Fe(CH_3SO_3)_3$,
$(FSO_3)_2$,
AgOTs,
$Me_3SiOTs$,
dodecylbenzene sulfonic acid,
naphthalene sulfonic acid,
benzene disulfonic acid,
benzene sulfonic acid,
1,3-benzene disulfonic acid,
2,5-dihydroxy-1,4-benzene disulfonic acid,
camphor sulfinic acid
naphthalene trisulfonic acid
dodecylbenzene sulfonic acid,
ethane sulfonic acid
1,5-naphthalene disulfonic acid,
nickel phthalocyanine tetrasulfonic acid,
phenyl phosphonic acid,
diphenyl phosphinic acid
phenyl phosphinic acid,
3-sulfopropyl acrylate,
3-sulfopropyl methacrylate,
sulfamic acid,
5-sulfosalicyclic acid,
trion (4,5-dihydroxy-1,3-benzene disulfonic acid),
vinyl sulfonic acid,
sulfanilic acid,
4-sulfophthalic acid,
sulfoacetic acid,
methyl phosphinic acid,
phenylphosphonic acid,
methyl phosphonic acid,
methyl orange,
sulfonated polystyrene,
sulfonated poly(2-vinyl naphthalene),
naphthol yellow,
naphthol blue black,
1,2-naphthoquinone-4-sulfonic acid,
naphthylazoxine S,
1-octane sulfonic acid,
t-butyl phosphonic acid,
ethyl phosphonic acid,
butyl phosphonic acid,
1,2-benzene disulfonic acid,
4-octylbenzene sulfonic acid,
2-mesitylene sulfonic acid,
2,6-naphthalene disulfonic acid,
2-naphthalene sulfonic acid,
1,3,6-naphthalene trisulfonic acid,
1,3,7-naphthalene trisulfonic acid,
sulfonazo III acid,
biphenyl disulfonic acid, biphenyl sulfonic acid,
1,8-dihydroxynaphthalene-3-6-disulfonic acid,
3,6-dihydroxynaphthalene-2,7-disulfonic acid,
4,5-dihydroxynaphthalene-2,7-disulfonic acid,
6,7-dihydroxy-2-naphthalene sulfonic acid,
1-naphthalene phosphoric acid,
1-naphthalene sulfonic acid,
1-naphthalene-5,7-dinitro-8-hydroxy,
1-naphthalene-4-hydroxy sulfonic acid,
4-bromo benzene sulfonic acid,
4-hydroxy-5-isopropyl-2-methyl benzene sulfonic acid
3,4-diamino benzene sulfonic acid benzenephosphoric acid,
1,3,5-benzene trisulfonic acid,
2-methyl-5-isopropyl benzene sulfonic acid,
3,4-dinitro benzene sulfonic acid,
2-methoxy benzene sulfonic acid,
1-naphthalene-5-hydroxy sulfonic acid,
1-naphthalene-7-hydroxy sulfonic acid,
1-naphthalene-3-hydroxy sulfonic acid,
2-napthalene-1-hydroxy sulfonic acid,
4-phenylamino benzene sulfonic acid,
1,6-naphthalene disulfonic acid,
1,5-naphthalene disulfonic acid,
1,3-naphthalene-7-hydroxy disulfonic acid, and
$Me_3SiOSO_2CF_3$.

The amount of dopant added to the polyaniline is not critical and may vary widely. In general, sufficient dopant is added to the polyaniline to at least form doped polymer which is a semi-conductor which has a conductivity of at least about $10^{-6} ohm^{-1} cm^{-1}$. The upper level of conductivity is not critical and will usually depend on the type of aniline polymer employed. In general, the highest level of conductivity obtained is provided without unduly adversely affecting the environmental stability of the polymer. In the preferred embodiments of the invention the amount of dopant employed is sufficient to provide a conductivity of at least about $10^{-4} ohm^{-1} cm^{-1}$ and in the particularly preferred embodiments is sufficient to provide a conductivity of from about $10^{-2} ohm^{-1} cm^{-1}$ to about $10^{+2} ohm^{-1} cm^{-1}$. Amongst these particularly preferred embodiments, most preferred are those embodiments in which unsubstituted polyaniline is employed and in which sufficient dopant is employed to provide a conductivity of at least about $10^{-1} ohm^{-1} cm^{-1}$ to about $10^{+2} ohm^{-1} cm^{-1}$, with amounts sufficient to provide a conductivity from about $10^0 ohm^{-1} cm^{-1}$ to about $10^{+2} ohm^{-1} cm^{-1}$ usually being the amounts of choice.

The method of forming the doped electrically conductive Polyaniline is not critical and may vary widely. Suitable techniques are those described in U.S. Pat. Nos. 4,442,187 and 4,321,114. Such processes include the direct chemical polymerization of molecules of Formula 1 in the presence of chemical species such as $[R_4(SO_3^-)_r](M^{+1})_r$, $[R_4(SO^-_2)_r](M^{+1})_r$, $[R_4(OPOR_6^-)_r](M^{+1})_r$, $[R_4(BO_2^=)_r](M^{+2})_r$, $[R_4(POR_6^-)_r](M^{+1})_r$ $[R_4(BO_2H^-)_r](M^{+1})_r$, $[R_4(PO_3^=)_r](M^{+2})_r$ or mixtures thereof. Also such process include electrochemical doping of 30 neutral polyaniline as described in U.S. Pat. No. 4,321,114. Another Process is electrochemical polymerization of aniline and its derivatives as described in Formula I in the presence of $[R_1SO_3^-]_n\ M^{+n}$ are described in Kobayashi, et al., *J. Electroanal. Chem.*, "Electrochemical Reactions Concerned with Electrochromism of Polyaniline Film-Coated Electrodes", 77, pp. 281–291 (1984). Yet another process of forming the polyaniline of this invention involves the exchange of non-thermally stable dopants in polyaniline with a thermally stable solute such as $R_4(SO_3^-)_r$, $R_4(OPO_2^=)_r$ and/or $R_4(O_2POH^-)_r$. For example, in this process polyaniline can be doped by contacting same with a solution containing excess of a compound which ionizes in solution into a suitable dopant such as $R_4(SO_3^-)_r(M^+)_r$, $R_4(OPO_2^=)_r(M^{+2})_r$ and $R_4(O_2POH^-)_r$ The essential polyaniline can include other optional ingredients. The nature of such optional ingredients can vary widely, and include those materials which are known to those of skill in the art for inclusion in polymer articles. For example, materials may be present which alter the physical or mechanical properties of the articles eventually formed from the polyaniline. Examples of such materials include other conventional polymers such as polycarbonate, polyacrylonitrile, polyvinyl chloride, polyvinylidene chloride, polyvinylidene fluoride, polyvinyl alcohol, polyethylene oxide, polystyrene, nylon, polyesterimide, polyimide, polyetherimide, cellulose, poly(1,4-cyclohexyldiene dimethylene terephthalate), poly(phenylene sulfide), phenolic resins, poly(ethylene terephthalate), alkyl resins poly(4-aminobutyric acid), poly(hexamethylene adipamide), poly(p-phenylene terephthalamide), poly[methane bis(4-phenyl)carbonate], acetate butyrate, allylic resins, polypropylene, polyethylene, cellulose acetate, epoxy resins, polyphenylene oxide, polyvinyl acetate, and the like. Materials may be present which either fill or form a substrate for the polyaniline. These components include other conductive polymers, such as conjugated backbone polymers as for example polyacetylene which may become conductive upon doping, graphite, metal carbon blacks, conductors, reinforcing fibers and inert fillers (such as clays and glass).

As will be appreciated by those skilled in polymer processing, the ability to form polymer articles through use of relatively low molecular weight polyaniline which are thereafter processed to form polyaniline having a higher molecular weight and strength enables one to prepare articles of a wide variety of shapes and sizes. Thus, for example, by spreading the relatively low molecular weight polyaniline on a surface and thereafter heating the polyaniline for a time and at a temperature sufficient to increase the molecular the desired extent.

When the original polyaniline is electrically conductive then the product will be electrically conductive. If the original polyaniline is neutral, the article will be neutral but can be render electrically conductive by conventional means, as for example by contacting the article with an aqueous toluene sulfonic acid solution, films, or coatings of any desired thickness can be prepared. Through use of this invention, extremely thin films can be prepared which are substantially transparent. By extruding a melt or a heater solution of the polyaniline through a die, removing volatiles where present and cooling fibers, films or molded articles can be made. If the molecular weight is not as high as desired these articles can be heated further at any stage in this operation. Similarly, by removing volatiles from the solution or cooling a melt of the polyaniline in a mold of the desired shape, shaped articles conforming in shape to the mold can be prepared. It will be appreciated that where the polyaniline is in solution some shrinkage may occur between the solution in its last flowable state to the final article, but such shrinkage is conventionally accounted for in molding polymers from solution. It is also contemplated that, once a solution is formed, a partial or substantial removal of solvent will occur prior to placing the solution on a surface or in a mold, with the final venting of solvent occurring on the surface or in the mold.

It is contemplated that, if additional soluble components are introduced into the solution or melt, they will, unless also volatile, be present in the shaped article formed. If the additional component is a non-volatile liquid, then the removal of volatile components may leave a plasticized form of doped conducting polymer or undoped neutral polymer. If the additional components are very volatile, then foamed or expanded cellular forms of the polymer may be formed. In the event that additional non-soluble components are present (or suspended) in the solution or in the melt of the polyaniline or polyaniline blend, the doped or undoped polymer will form around, or be filled with, the insoluble material. If, for example, the additional components are glass fibers, the relative amounts of fibers and doped or undoped polymer remaining will cause either the polymer to be fiber-filled, the fibers to be polymer coated or impregnated, or some intermediate composite of fibers and doped or undoped polymer to be formed. In the case of systems wherein the amount of non-soluble component greatly exceeds the doped or undoped polymer remaining, individual particles or shapes of non-soluble components coated or impregnated with doped or undoped polymer will be formed. Examples of articles formed from non-soluble components and the present doped polymer solutions include conductive polymer coated-housings for sensitive electronic equipment (microprocessors), infrared and microwave absorbing shields, flexible electrical conducting connectors, conductive bearings, brushes and semiconducting photoconductor junctions, antistatic materials for packaging electronic components, carpet fibers, waxes for floors in computer rooms and an antistatic spray finisher for plastics, and thin, optically transparent antistatic finishes for CRT screens, aircraft, auto windows and the like.

The following specific examples are present to illustrate the invention and are not to be construed as limitations thereon.

EXAMPLE 1

Aniline (50 g, 0.54 mole) and 204.4 g of p-toluene sulfonic acid monohydrate (1.08 mole, Aldrich Chemical) and 0.12 g of iron (II) sulfate heptahydrate were dissolved in 1750 mL of $H_2O$ in a three neck round bottom flask equipped with a mechanical stirrer and an addition funnel. After the reaction mixture was cooled to 15° C., an aqueous solution of ammonium persulfate (157 g in 270 mL $H_2O$) was added dropwise through the addition funnel. The overall addition time was 2 hrs. and 50 min. After the addition was finished, the reaction mixture was stirred for another 30 minutes.

The resultant solid was collected by filtration. The filtration cake was then dispersed and stirred for 30 min. in 1.5 L of a 12 wt % aqueous solution of p-toluene sulfonic acid for four times. Each time, the solid was re-collected and then re-dispersed into a fresh p-toluene sulfonic acid solution.

After the above treatment, the filter cake was then dispersed and stirred for 30 min. in 1.5 L of 8 wt % methanol solution of p-toluene sulfonic acid for two times. Each time, a fresh p-toluene sulfonic acid was used.

The final filter cake was dried at 25° C. in air for 15 hrs. and then at 130° C. under dynamic vacuum for 3 hrs.

Yield was 83 g.

Elemental Analysis (wt %) was C(63.77), H(4.99), N(8.30), S(8.88), O(13.87).

Intrinsic Viscosity in concentrate sulfuric acid at 25° C. was 0.58 dL/g.

Percent of the insoluble in concentrated $H_2SO_4$ was 0%.

Surface area was 12.3 $m^2/g$.

EXAMPLE 2

Another batch of polyaniline was prepared using the procedure of Example 1, except the drying step. After drying in air at 25° C. for 15 hrs., the polyaniline was dried at 130° C. under dynamic vacuum for 27 hrs.

Yield was 85 g.

Elemental Analysis (wt %) was C(63.68), H(4.83), N(8.15), S(8.79), O(14.67).

Intrinsic Viscosity in concentrate sulfuric acid at 25° C. was 0.88 dL/g.

Percent of the insoluble in concentrated $H_2SO_4$ was 0%. Surface area was 13.0 $m^2/g$. The results showed that most of the properties, except intrinsic viscosity of polyaniline, were not affected within experimental errors by this longer heating treatment. The intrinsic viscosity of the more extensively heated sample had been significantly increased.

This result indicated that a solid state chain coupling reaction occurred at about 130° C.

EXAMPLE 3

Aniline (50 ml 51.1 g, 0.55 mole) and 340 mL of 65 wt % aqueous solution of p-toluene sulfonic acid (Sloss Chemical) were dissolved in 1570 mL of $H_2O$ in a three neck round bottom flask equipped with a mechanical stirrer and an addition funnel. The reaction mixture was cooled to 20° C. and 10mL of an aqueous solution of ammonium persulfate (137.8 g in 530 mL $H_2O$) was added in one portion. The resultant mixture was stirred for 10 minutes and the remainder of the ammonium persulfate solution was add dropwise. The overall addition time was 30 min. After the addition was finished, the reaction mixture was stirred for another 30 minutes. The resultant solid was collected by filtration. The filter cake was then dispersed and stirred in 1.5 L of a 2 wt % aqueous solution of p-toluene sulfonic acid at 60° C. for 60 min. The solid was collected and the same treatment was repeated 3 more times with a fresh p-toluene sulfonic acid solution each time.

The last filter cake was then dispersed and stirred in 1.5 L methanol at ambient temperature for 30 min. The solid was collected and the same treatment was repeated.

The resultant filter cake was dried in air at 25° C. for 30 min. and then under dynamic vacuum at 130° C. for 3 hrs.

Yield was 75 g.

Elemental Analysis (wt %) was C(65.66), H(5.06), N(8.85), S(7.89), O(12.24).

Intrinsic Viscosity in concentrate sulfuric acid at 25° C. was 0.67 dL/g.

Percent of the insoluble in concentrated $H_2SO_4$ was 0%.

Surface area was 18.4 $m^2/g$.

EXAMPLE 4

Another batch of polyaniline was prepared according to the procedure of Example 3, except the heat treatment conditions. This batch of polyaniline was heated at 130° C. in a closed vacuum system in the presence of saturated hot water steam for 3 hrs.

Yield was 73 g.

Elemental Analysis (wt %) was C(65.04), H(4.81), N(8.73), S(8.09), O(12.74).

Intrinsic Viscosity in concentrate sulfuric acid at 25° C. was 1.40 dL/g.

Percent of the insoluble in concentrated $H_2SO_4$ was 29.6%.

Surface area was 18.4 $m^2/g$.

The result indicated that the solid state chain coupling reaction in polyaniline powder can be enhanced by the presence of a plasticizer.

EXAMPLE 5

A piece of poly(ethylene terephalate) film (4 ×4 inch) was coated with 1.6 wt % solution of poly(anilinium tosylate) in pyrrolidine by a transfer coating technique. In this technique, polyaniline solution was homogeneously laid down on the plastic film by a metal screen roller which contained hundreds of regularly engraved cells per square inch.

The coated film was heated for 3 minutes at 100° C. by an infrared oven. The coating turned green and conductive after the solvent evaporated away. The surface resistance measured by a 4-in-line probe method was $10^6$ Ohm/sq. The prepared coating had very good abrasive resistance. The coating stayed intact after rubbed against a paper towel.

For comparison, another coating was prepared similarly, except without heating treatment. The coating also turned green and had a similar conductivity as the one prepared in the above. This coating however had Poor abrasive resistance. The coating flaked off when rubbed against a paper towel.

EXAMPLE 6

Green conductive poly(anilinium tosylate) powders (5 g) was prepared as in Example 3, and was suspended in 35 mL of N-methyl pyrrolidinone. After the addition of 3.3 g of tripropylamine, the suspended poly(anilinium tosylate) powder started to dissolve forming a blue solution of low viscosity (water-like viscosity). The resulting solution mixture was then heated at 83° C. for 20 minutes to form a highly viscous homogeneous blue solution. This viscous solution was further transformed into a blue solid rubber-like gel by further heating at 105° C. for 20 minutes. From this gel, blue conductive polymer fibers were spun. After air-drying and redoping with 10 wt % p-toluene sulfonic acid for 20 minutes, green conductive fibers were obtained. The conductivity was about 0.15 $cm^{-1}$ as measured by a four-in-line probe.

I claim:

1. A process for increasing the molecular weight of polyaniline which comprises heating neutral or electrically conductive polyaniline or a mixture thereof having an intrinsic viscosity for a time and at a temperature sufficient to increase the molecular weight of said polyaniline such that the intrinsic viscosity of said polyaniline is increased at least about 0.05 dL/g, wherein aid polyaniline is a polyaniline homopolymer or copolymer derived from polymerizing an aniline of the formula:

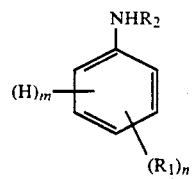

wherein:
n is an integer from 0 to 5;
m is an integer from 0 to 5, with the proviso that the sum of n and m is 5;
$R_1$ is phosphinic acid, phosphonic acid, sulfonic acid, boric acid, phosphoric acid, sulfonate salt, borate salt, hydroxy, phosphonate salt, phosphinate salt, phosphate salt, sulfinic acid, nitro, sulfinate salt, carboxylic acid, halo, carboxylate salt, cyano, deuterium, or alkyl, alkenyl, alkoxy, cycloalkyl, cycloalkenyl, alkanoyl, alkylthio, alkynyl, alkylamino, dialkylamino, arylamino, diarylamino, alkylarylamino, aryloxy, hydroxy, alkylthoalkyl, alkylaryl, arylalkyl, amino, arylalkyl, alkylsufinyl, alkoxyalkyl, alkylsulfonyl, aryl, arylthio, arylsulfinyl, alkoxycarbonyl, alkylsilane, or arylsulfonyl, which may be unsubstituted or substituted with one or more amino, phosphinate salt, alkylamino, dialkylamino, arylamino, diarylamino, phosphinic acid, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties; or any two $R_1$ substituents or any one $R_1$ substituent and $R_2$ substituent taken together may form an alkylene, alkynylene or alkenylene chain which chain may be unsubstituted or substituted with one or more amino, alkylamino, phosphinic acid, phosphinate salt, dialkylamino, arylamino, diarylamino, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties or which chain may include one or more divalent ester, carbonyl, nitrogen, sulfur, sulfinyl, sulfonyl or oxygen groups said chain completing a 3, 4, 5, 6, 7, 8, 9 or 10 membered aromatic, heteroalicyclic, heteroaromatic or alicyclic carbon ring, or $R_1$ is an aliphatic moiety having repeat units of the formula:

$(OCH_2CH)_q O—CH_3, (OCH_2CH(CH_3))_q O—CH_3,$ $(CH_2)_q CF_3, (CF_2)_q CF_3$ or $(CH_2)_q CH_3$ wherein q is a positive whole number; and
$R_2$ is the same or different at each occurrence and is $R_1$ substituents or hydrogen.

2. A process according to claim 1 wherein the intrinsic viscosity of said polyaniline is increased at least about 0.1 dL/g.

3. A process according to claim 2 wherein said increase in viscosity is at least about 0.15 dL/g.

4. A process according to claim 3 wherein said increase is viscosity is at least about 0.20 dL/g.

5. A process according to claim 4 wherein said homopolymer or copolymer is of the formulas II to V:

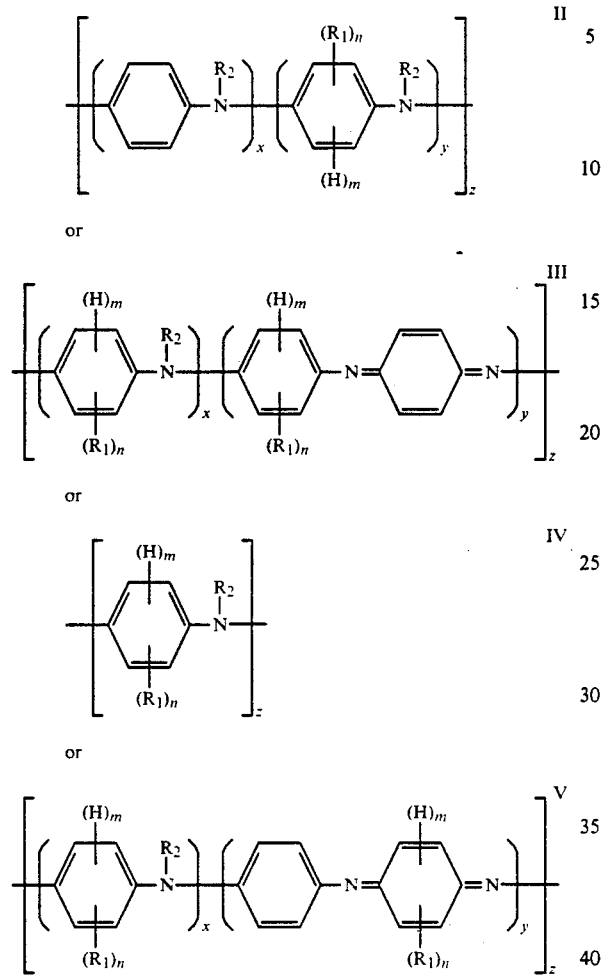

wherein:
- x and y are the same or different at each occurrence and are integers equal to or greater than 0, with the proviso that the sum or x and y are greater than 0;
- z is an integer equal to or grater than about 1;
- n is an integer from 0 to 3;
- m is an integer from 1 to 4, with the proviso that the sum of n and m is 4;
- $R_1$ is the same of different at each occurrence and is $R_3$ substituents or hydrogen;
- $R_3$ is the same or different at each occurrence and is alkyl, alkenyl, alkoxy, cycloalkyl, cycloalkenyl, alkanoyl, amino, alkylamino, dialkylamino, arylamino, diarylamino, alkylarylamino, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, phosphinic acid, phosphonic acid, alkylsilyl, boric acid, arylsulfonyl, carboxylic acid, halo, hydroxy, phosphate salt, sulfonate salt, phosphonate salt, borate salt, phosphinate salt, carboxylate salt, nitro, cyano, sulfonic acid, phosphoric acid or aryl, alkyl or alkoxy substituted with one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salt, phosphinic acid, phosphinate salt, carboxylate salt, phosphonic acid or borate salt substituents; or any two $R_1$ groups or any one $R_1$ group and $R_2$ group together may form an alkylene or alkenylene chain, which contain may be unsubstituted or substituted with one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salts, phosphinic acid, phosphinate salt, carboxylate salts, phosphonic acid or borate salt substituents or which chain may include one or more divalent nitrogen, ester, carbonyl, sulfur, sulfinyl, sulfonyl or oxygen groups, said chain completing a 3, 5, 5, 6, 7, 8, 9 or 10 membered heteroaromatic, heteroalicyclic, aromatic or alicyclic carbon ring.

6. A process according to claim 2 wherein m is from about 2 to about 4.

7. A process according to claim 4 wherein m is from about 3 to about 4.

8. A process according to claim 4 wherein said polyaniline is derived from substituted anilines.

9. A process according to claim 4 wherein said polyaniline is derived from unsubstituted aniline.

10. A process according to claim 5 wherein $R_3$ is the same or different at each occurrence and is alkyl or alkoxy having from 1 to about 30 carbon atoms.

11. A process according to claim 10 wherein $R_3$ is the same or different at each occurrence and is alkyl having from 1 to about 10 carbon atoms or alkoxy having from 1 to about 20 carbons.

12. A process according to claim 4 wherein n is 0 to 1.

13. The process of claim 3 wherein $R_1$ is alkyl or substituted alkyl.

14. A process according to claim 5 wherein said homopolymer or copolymer is of the Formulas II to V wherein:
- n is an integer from 0 to about 2;
- m is an integer from 2 to 4, with the proviso that the sum of n and m is equal to 4;
- $R_1$ is aryl, alkyl or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid, sulfinate salt, carboxylate salt, sulfonate salt, amino, alkylamino, dialkylamino, arylamino, hydroxy, diarylamino, alkylarylamino, or alkyl, aryl or alkoxy substituted with phosphonic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphonate salt, phosphinate salt, carboxylic acid or sulfonic acid substituents;
- $R_2$ is the same or different at each occurrence and is a $R_1$ substituent or hydrogen;
- x is an integer equal to or greater than 1;
- y is equal to or greater than 0, with the proviso that the ratio of x to y is greater than about 0; and
- z is an integer equal to or greater than about 5.

15. The process according to claim 14 wherein:
- n is an integer from 0 to 1;
- m is an integer from 3 to 4, with the proviso that the sum of n and m is equal to 4;

$R_1$ is aryl, alkyl or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylyarylamino, or alkyl or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents;

$R_2$ is the same or different at each occurrence and is a $R_1$ substituent or hydrogen;

x is an integer equal to or greater than 2;

y is equal to or greater than 0, with the proviso that the ratio of x to y is greater than about 0.5; and z is an integer equal to or greater than about 5.

16. The process of claim 15 wherein:

n is an integer from 0 to 1;

m is an integer from 3 to 4, with the proviso that the sum of n and m is equal to 4;

$R_1$ is aryl, alkyl, alkoxy, amino, alkylamino, dialkylamino, arylamino, diarylamino, alkylarylamino, halo, sulfonic acid, sulfonate salt, carboxylic acid or carboxylate salt or alkyl or aryl substituted with one or more sulfonic acid, carboxylate salt, amino, alkylamino, dialkylamino, arylamino, diarylamino, halo, alkylarylamino, sulfate salt, sulfonate salt, or carboxylic acid substituents wherein aromatic moieties include from 6 to about 21 carbon atoms and the aliphatic moieties are from 1 to about 15 carbon atoms;

$R_2$ is hydrogen;

x is an integer equal to or greater than 2;

y is equal to or greater than 1, with the proviso that the ratio of x to y is equal to or greater than about 1; and z is an integer equal to or greater than about 5.

17. The process of claim 16 wherein:

n is 0 or 1;

m is 3 or 4, with the proviso that the sum of n and m is 4;

$R_1$ is sulfonic acid, a sulfonate salt, alkoxy or alkyl; and $R_2$ is hydrogen, arylsulfonyl or alkylsulfonyl.

18. The process of claim 17 wherein the intrinsic viscosity of said polyaniline is increased at least about 0.1 dL/g.

19. The process of claim 18 wherein said increase in viscosity is at least a 1.2 dL/g.

20. The process of claim 18 wherein:

n is 1;

m is 3;

$R_1$ is sulfonic acid or a sulfonic salt; and $R_2$ is hydrogen.

21. The process of claim 18 wherein:

n is 0;

m is 4; and $R_2$ is hydrogen.

22. The process of claim 21 wherein $R_1$ is sulfonic acid or a salt thereof.

23. The process of claim 22 wherein $R_1$ is sulfonic acid.

24. The process of claim 1 wherein said process comprises heating a mixture of two or more different types of polyaniline to form a block copolymer formed of blocks of two or more of said polyanilines.

25. The process of claim 1 wherein said polyaniline is electrically non-conductive.

26. The process of claim 1 wherein said polyaniline is electrically conductive.

27. The process of claim 26 wherein said polyaniline is doped with one or more organic acid dopants or salts thereof having anionic moieties of the formula:

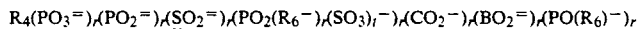

$R_4(PO_3^=)_j(PO_2^=)_k(SO_2^=)_l(PO_2(R_6^-))_m(SO_3)_l^-)_n(CO_2^-)_p(BO_2^=)_q(PO(R_6))^-)_r$ and having a cationic moiety of the Formula:

$M^{+s}$ wherein at least one of the cation moieties of the formula $M^{+s}$ is a proton or is a moiety which can be transformed into a proton under use conditions;

$M^{+s}$ is a cationic species having a positive charge s;

s is an integer equal to or greater than 1;

$R_4$ and $R_6$ are organic radicals or amino, and r is an integer equal to or greater than 1.

28. The process of claim 27 wherein said dopants are acids or acid derivatives of the formula;

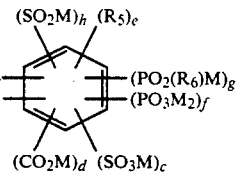

$R_4(PO_2(R_6)M)_g(PO_3M_2)_f(SO_3M)_c(CO_2M)_d(PO_2M_2)_l(SO_2M)_h(PO(R_6))_i$ or wherein:

M is $H^+$, or other metal or non-metal cation with the proviso that at least one of M is $H^+$ or a moiety which can be thermally or chemically transformed into a proton under use conditions;

t is 0, 1, 2, 3 or 4;

i is 0, 1, 2, 3 or 4;

h is 1, 1, 2, 3 or 4;

c is 0, 1, 2, 3 or 4;

d is 0, 1, 2, 3 or 4;

f is 0, 1, 2, 3 or 4;

g is 0, 1, 2, 3 or 4 with the proviso that at least one of t, i, h, c, d, f or g is other than 0;

e is 0, 1 or 2; and $R_4$, $R_5$ and $R_6$ are the same or different at each occurrence and are nitro, cyano, hydroxy, halo, amino, alkylamino, dialkylamino, arylamino, diarylamino, alkylarylamino, alkoxy, or salt substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid phosphate salt, boric acid, sulfinate salt, phosphinate salt, sulfinic acid, borate salt, phosphinic acid, phosphonate salt, phosphonic acid, carboxylic acid, nitro, and carboxylate salt or any two $R_4$ or any two $R_5$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or $R_4$ or $R_5$ is an aliphatic moiety of the formula:

—$(CH_2)_qCF_3$, —$(CF_2)_qCF_3$, —$(CH_2)_qCH_3$

—$(OCH_2CH_2)_qOCH_3$ or
—$(OCH_2CH(CH_3))_qOCH_3$ ps wherein:
q is a positive whole number from 1 to about 10.

29. The process of claim 28 wherein said dopants are acids, acid derivatives or a combination thereof of the formula:

$$R_4(PO_2(R_6)M)_g(PO_3M_2)_f(SO_3M)_c(CO_2M)_d(PO_2M_2)_t(SO_2M)_h(PO(R_6)M)_i \text{ or}$$

wherein:
c is 0, 1, 2 or 3;
d, t, i, f, g and h are the same or different at each occurrence and are with the proviso that at least one of c, h, i, t, d, f or g is other than 0;
e is 0, 1 or 2;
$R_4$ and $R_5$ are the same or different are hydroxy, amino, alkylamino, dialkylamino, arylamino, diarylamino, alkyl aryl amino, substituted or unsubstituted phenyl or alkyl wherein permissible substituents are selected from the group consisting of alkyl, hydroxy, amino, alkylamino, dialkylamine, arylamine, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphinate salt, sulfonic acid, carboxylic acid, phosphoric acid, sulfinic acid or sulfinate salts or any two $R_6$ substituents together may form an unsubstituted or substituted alkenylene chain completing a naphthalene, anthracene or phenanthracene fused ring system wherein permissible substituents are as described above or $R_4$ or $R_5$ is an aliphatic moiety of the formula:

—$(CH_2)_qCF_3$, —$(CF_2)_qCR_3$, —$(CH_2)_qCH_3$,

—$(OCH_2CH_2)_qOCH_3$ or —$(OCH_2CH(CH_3))_qOCH_3$ wherein:

q is a positive whole number from 1 to about 10;
$R_6$ is alkyl, alkoxy, aryloxy or aryl; and
M is $H^+$, or other metal or non-metal cation, with the proviso that at least one of M is $H^+$ or a moiety which can be thermally or chemically transformed into a proton under use conditions.

30. The process of claim 29 wherein said dopants are of the formula:

$R_{4g}(PO_2(R_6)M)_g(SO_3M)_c(CO_2M)_d$
or

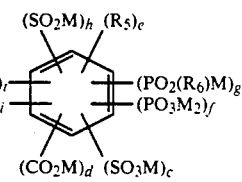

wherein:
c, d, e, and g are the same or different and are 0, 1 or 2 with the proviso that at least one of c, d, and g is not 0;
$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphinate salt, amino or carboxylic acid groups, or phenyl substituted with one or more alkyl, alkoxy, fluoroalkyl, sulfonic acid, phosphinic acid, phosphinic salt, sulfonate salt, carboxylate, hydroxy, nitro, cyano, or carboxylic acid groups or any two $R_4$ or $R_5$ substituents together may form an alkylene or alkenylene chain completing a naphthalene anthracene or phenanthracene fused system which may be substituted with one or more alkyl, alkoxy, fluoro, phosphinic acid, phosphinate salt, fluoroalkyl, sulfonic acid, sulfonate salt, carboxylic acid, carboxylate salt, hydroxy, nitro, amino or cyano groups;
$R_6$ is aryl, aryloxy, alkyl or alkoxy; and
M is $H^+$ or other metal or non-metal cation, with the proviso that at least one of M is $H^+$ or is a moiety which can be thermally transformed into a proton under process conditions.

31. A process of claim 1 wherein said temperature is at least about 30° C. and said time is equal to or greater than a fraction of a minute.

32. A process of claim 31 wherein said heating step is carried out in the presence of a plasticizing agent.

33. A process of claim 31 wherein said polyaniline comprises a plasticizing agent.

34. A process of claim 31 wherein said heating is carried out under vacuum.

* * * * *